(12) United States Patent
Aranzadi De Miguel et al.

(10) Patent No.: US 10,100,525 B2
(45) Date of Patent: Oct. 16, 2018

(54) WIND TURBINE WITH A CONCRETE TOWER AND METHOD FOR THE ASSEMBLY THEREOF

(71) Applicant: Acciona Windpower, S.A., Sarriguren (Navarra) (ES)

(72) Inventors: Paula Aranzadi De Miguel, Sarriguren (Navarra) (ES); Javier Martin Diez, Sarriguren (Navarra) (ES); Ivan Garcia Maestre, Sarriguren (Navarra) (ES); Inaki Etxandi Irungarai, Sarriguren (Navarra) (ES); Asier Gomez Andueza, Sarriguren (Navarra) (ES); Teresa Arlaban Gabeiras, Sarriguren (Navarra) (ES); Jose Luis Aristegui Lantero, Sarriguren (Navarra) (ES); Enrique Soroa Sisamon, Sarriguren (Navarra) (ES); Ander Gaston Lujambio, Sarriguren (Navarra) (ES); Jose Miguel Garcia Sayes, Sarriguren (Navarra) (ES); Miguel Nunez Polo, Sarriguren (Navarra) (ES)

(73) Assignee: ACCIONA WINDPOWER, S.A., Navarra (ES)

( * ) Notice: Subject to any disclaimer, the term of this patent is extended or adjusted under 35 U.S.C. 154(b) by 0 days.

(21) Appl. No.: 14/969,132

(22) Filed: Dec. 15, 2015

(65) Prior Publication Data
US 2016/0169192 A1    Jun. 16, 2016

(30) Foreign Application Priority Data
Dec. 15, 2014 (EP) .................................. 14382520

(51) Int. Cl.
*E04F 11/022* (2006.01)
*E04H 12/12* (2006.01)
(Continued)

(52) U.S. Cl.
CPC ............ *E04F 11/022* (2013.01); *E04G 3/246* (2013.01); *E04G 5/046* (2013.01); *E04H 12/12* (2013.01);
(Continued)

(58) Field of Classification Search
CPC ......... E04G 5/062; E04G 3/246; E04H 12/16; E04H 12/342
See application file for complete search history.

(56) References Cited

U.S. PATENT DOCUMENTS 1,755,116 A * 4/1930 Henderson ............... E04G 5/062
                                              248/240.3
2,066,984 A * 1/1937 Lamb ........................ E04G 5/06
                                              182/113
(Continued)

FOREIGN PATENT DOCUMENTS

DE     2144811 A1 *  4/1973 ............... B63C 5/02
DE     4114530 A1 * 12/1992 ............... E04G 5/04
(Continued)

*Primary Examiner* — Adriana Figueroa
(74) *Attorney, Agent, or Firm* — Hayes Soloway PC

(57) ABSTRACT

The present invention relates to a wind turbine with a concrete tower wherein the tower comprises a plurality of sections formed by segments a platform system comprising a plurality of platforms, wherein the platform system is configured to allow access to junction areas between sections wherefrom optionally, the execution of joints between adjacent sections may be carried out, the platforms situated inside the tower once erected being detachable, stackable and transportable.

16 Claims, 3 Drawing Sheets

(51) Int. Cl.
  *E04H 12/34*   (2006.01)
  *E04G 3/24*    (2006.01)
  *E04H 12/16*   (2006.01)
  *F03D 13/20*   (2016.01)
  *E04G 5/04*    (2006.01)
  *F03D 13/10*   (2016.01)

(52) U.S. Cl.
  CPC ........... *E04H 12/16* (2013.01); *E04H 12/342* (2013.01); *F03D 13/10* (2016.05); *F03D 13/20* (2016.05); *Y02E 10/728* (2013.01)

(56) References Cited

U.S. PATENT DOCUMENTS

| | | | | |
|---|---|---|---|---|
| 3,837,606 | A * | 9/1974 | Hikai | B63C 5/02 248/242 |
| 4,323,140 | A * | 4/1982 | Foscarini | E02D 29/12 182/128 |
| 5,865,410 | A | 2/1999 | Horen | |
| 7,739,843 | B2 * | 6/2010 | Cortina-Cordero | E04H 12/12 416/DIG. 6 |
| 7,765,766 | B2 * | 8/2010 | Gomez | E04H 12/12 52/742.16 |
| 8,555,600 | B2 * | 10/2013 | Cortina-Cordero | E04H 12/16 52/123.1 |
| 8,615,965 | B2 * | 12/2013 | Kryger | E04H 7/22 52/123.1 |
| 8,701,369 | B2 * | 4/2014 | Kristensen | F03D 1/001 52/223.4 |
| 2007/0125037 | A1 * | 6/2007 | Meiners | E04H 12/085 52/848 |
| 2008/0040983 | A1 | 2/2008 | Fernandez Gomez et al. | |
| 2009/0126309 | A1 * | 5/2009 | Lyness | E04H 12/00 52/650.3 |
| 2009/0173577 | A1 * | 7/2009 | Wobben | E04G 1/36 182/128 |
| 2009/0211172 | A1 * | 8/2009 | Scholte-Wassink | F03D 1/001 52/40 |
| 2010/0122508 | A1 * | 5/2010 | Kristensen | F03D 1/001 52/651.01 |
| 2011/0140437 | A1 * | 6/2011 | Vemuri | F03D 13/20 290/55 |
| 2013/0174508 | A1 * | 7/2013 | Reed | E04H 12/08 52/655.1 |
| 2013/0174509 | A1 * | 7/2013 | Reed | E04H 12/08 52/655.1 |
| 2013/0299277 | A1 * | 11/2013 | Kyatham | E06C 9/02 182/129 |
| 2014/0339019 | A1 * | 11/2014 | Hulett | E04G 3/20 182/113 |
| 2015/0184402 | A1 * | 7/2015 | Gardner | E04G 3/28 182/131 |
| 2015/0292229 | A1 * | 10/2015 | Kollegger | E04H 12/341 52/742.14 |

FOREIGN PATENT DOCUMENTS

| | | | | |
|---|---|---|---|---|
| DE | 4340199 C1 * | 4/1995 | | E04G 5/04 |
| EP | 512428 * | 11/1992 | | |
| EP | 632171 * | 1/1995 | | |
| EP | 1087075 A1 * | 3/2001 | | E04G 3/20 |
| EP | 1544376 A2 | 6/2005 | | |
| FR | 2589506 A1 * | 5/1987 | | E04G 5/04 |
| FR | 2589506 A1 | 5/1987 | | |
| FR | 2610027 A1 * | 7/1988 | | E04G 5/04 |
| FR | 2987856 A1 * | 9/2013 | | E04G 5/04 |
| WO | 2014067884 A1 | 5/2014 | | |

\* cited by examiner

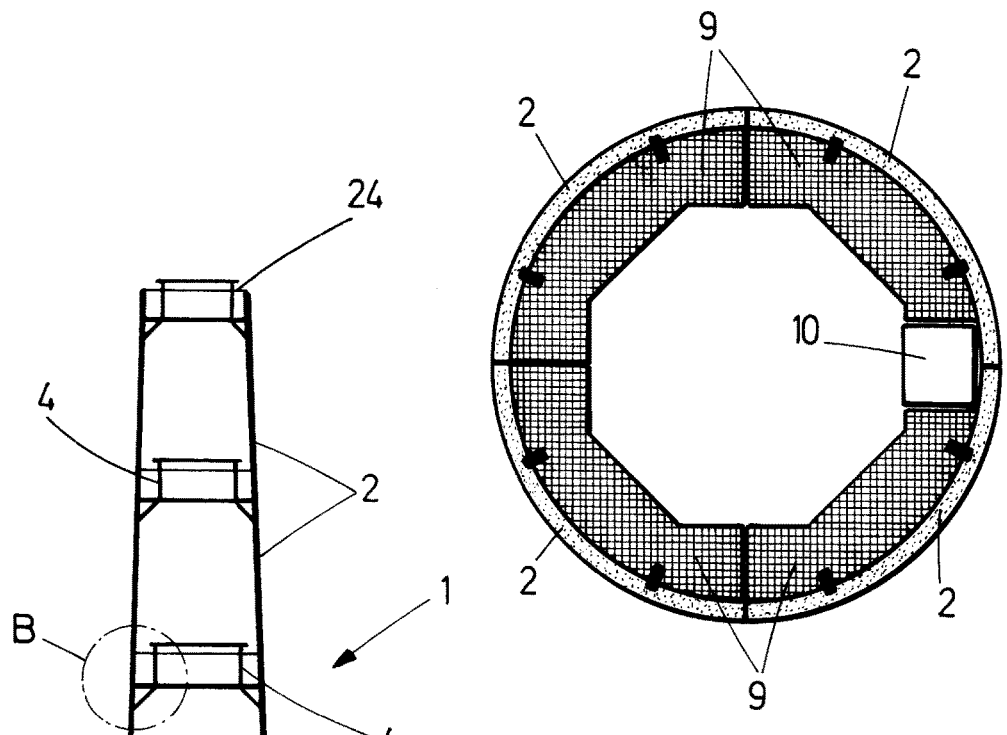
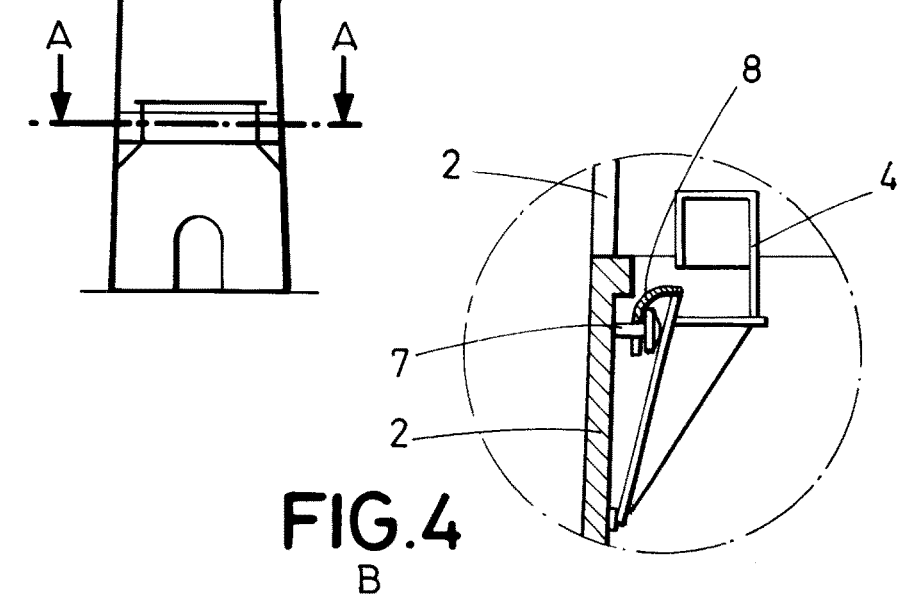

WIND TURBINE WITH A CONCRETE TOWER AND METHOD FOR THE ASSEMBLY THEREOF

OBJECT OF THE INVENTION

The present invention relates to a wind turbine with a concrete tower and a method for the assembly of the wind turbine with a concrete tower.

The object of the present invention is a wind turbine with a concrete tower comprising internal platforms within the segments of the sections of the concrete tower allowing to carry out the assembly of said sections and the execution of connections between joints of sections, the internal platforms being detachable, stackable and transportable.

BACKGROUND OF THE INVENTION

During the field assembly of the concrete towers for wind turbines, a series of platforms need to be arranged inside the tower sections formed by segments to be assembled so that technical staff can carry out the appropriate connections between the different sections.

Upon completion of the tasks to connect the sections, either by injecting mortar between joints for connections between concrete sections, or by installing connecting bolts between sections in bolted connections, or by any other attachment method used between wind turbine tower sections disclosed in the prior art, the platforms are installed in the central shaft of the tower, leaving a small space to house the elevator. The main problem of this system is that, being absolutely necessary in order to erect the tower, it is expensive and only useful during the construction stage and of little use in the operation stage of the wind turbine. In addition, joining the platforms to each segment is a complex task that involves numerous resources since it requires drilling the segment at several points and arranging anchoring elements between the latter and the platform.

The concrete tower for a wind turbine and method of assembly of a concrete tower for a wind turbine solve all the above drawbacks.

DESCRIPTION OF THE INVENTION

The present invention relates to a wind turbine with a concrete tower, wherein the tower comprises a plurality of sections formed by segments and a platform system comprising a plurality of platforms, wherein the platform system is configured to allow access to junction areas between sections from where the attachment between adjacent sections can optionally be carried out.

The platform system is further configured to be at least partially anchored in a detachable manner to an inner wall of the section, inner wall meaning the wall of the section located inside the tower once erected.

The platforms of the platform system are anchored to the wall of the section situated inside the tower once erected, in an area or at a height that allows the access to the joining surface connecting the section immediately above, so that technical staff located on the platforms can help to guide the section or segment, depending on the assembly procedure, to the correct position and perform any necessary work on them such as carrying out the execution of the joints between adjacent sections (pouring mortar, applying resin, tightening nuts, etc.)

Preferably, the concrete tower sections comprise at least a first anchoring element attached to the wall of the section inside the tower once erected, the platform system being configured to be at least partially anchored in a detachable manner to at least the first anchoring element attached to the wall of the section inside the tower once erected.

Each platform of the platform system is arranged internally in each section of the tower at the height of the joint between adjacent sections, these platforms being accessible by stairs and/or an elevator arranged inside the wind turbine tower, in order to perform from such platforms all work necessary during the assembly and securing together of two adjacent sections of the tower by means of any of the procedures known in the prior art, i.e. guiding the upper section to slot it into the lower section, bolting the section joint flanges, installing the fasteners required to secure the attachment between sections, guiding the steel bars and pouring concrete into the junction area between sections, and extracting samples during curing stage to verify the correct execution in the event of concreted joints, etc.

The wind turbine with a concrete tower thus constituted makes it possible to remove from the platform system those platforms that are not necessary for the normal operation of the wind turbine and leave installed those platforms that are necessary to access areas regularly used to effect operation and maintenance tasks.

In addition, the platforms of the system platforms comprise a set of modules that are configured to be taken down through the interior of the wind turbine tower, allowing their extraction through a tower door. These modules can be folding modules.

Preferably, the wind turbine with a concrete tower of the present invention proposes at least one platform module per segment, wherein the module or modules can be coupled to said first segment preferably by means of two first anchoring elements attached to the wall of the segment situated inside the tower once erected. These modules are disconnected from the segment and lowered to the base of the tower, where they can be folded to be extracted through the tower door.

This enables the modules to be pre-assembled on certain segments at the factory or wind-farm, before forming the sections. Thus, part of the work can be done before assembling the wind turbine. However, if there are fewer modules than segments in each section, the modules should be anchored to more than one segment and therefore assembly would be much more complicated.

The platform system, being configured to be anchored at least partially in a detachable manner to at least the first anchoring element attached to the wall of the section inside the tower once erected, makes it possible to not detach, after erecting the tower, some of the platforms of the platform system, preferably the top ones, as these are necessary to carry out maintenance on the junction area between the tower and a nacelle of the wind turbine.

The geometry of each module is such that on forming a tower section, a continuous platform is obtained along its entire interior perimeter, except for a space configured for the passage of an elevator and/or stairs, wherein continuous platform means that despite being modular, allows the passage of a technician around the whole perimeter of the section except for the space configured for the passage of the elevator and/or stairs.

Preferably, the platforms of the platform system comprise at least one second anchoring element which assists the first anchoring element to anchor, in a detachable manner, the platform system to the wall of the section situated inside the tower once erected.

Optionally, the modules comprise a base and a safety rail, wherein the base and safety rails are collapsible so that, during assembly, both remain in the folded position so as not to interfere with the work of assembling the segments to form the tower section. The geometry of the base and the safety rail are such that they prevent interference between different bases and lifting slings during disassembly.

The geometry of the base is that of an annulus sector, wherein the radius of the greater arc of a circumference is slightly smaller than the inner radius of the segment in the section in which said base is arranged, preferably 5 cm smaller. The arc lengths forming the base geometry are such that, complying with the above premise, they cover the length of the chord of the section in which they are installed except for a stretch, preferably of 2.5 cm. Thus, regardless of the position of the second anchoring elements of the platforms, the base is formed almost continuously covering a horizontal surface which allows access to the perimeter of the section of the segment wherein said base is installed.

Additionally, in the bases adjacent to the elevator shaft of the tower, the arc length is such that, covering the maximum chord length of the segment in the section in which the base is installed, it allows the passage of the tower elevator. In these cases the gap between the elevator and the base will be less than 10 cm, preferably 5 cm.

The distance between the arcs of a circumference is determined by the length of two straight sides of the annulus sector and defines the width of the base. This length is such to allow the passage of a person walking on the base of the module, being for example 800 mm.

In this way the platforms of the platform system of the wind turbine with a concrete tower of the present invention are removable, detachable, stackable and transportable for their reuse in the assembly of other wind turbines.

The invention also relates to the method of assembly of a wind turbine with a concrete tower comprising a plurality of sections formed by segments and platform system comprising a plurality of platforms, wherein the platform system is configured to allow access to junction areas between adjacent sections, and wherein the method comprises the following steps:

- a step of connecting a platform system comprising a plurality of platforms to a wall of a plurality segments being situated in the interior of the tower once erected, which form sections of the concrete tower;
- a step of pre-assembly of the sections of the concrete tower wherein for each section a plurality of segments are joined together;
- a step of lifting and stacking of the plurality of sections that make up the concrete tower;
- a step of executing joints between adjacent sections; and
- a step of detaching the platform system, at least partially, from the segments which form the sections of the concrete tower.

Preferably, the method for assembling the wind turbine with a concrete tower of the present invention proposes the connection of at least one platform module per segment during the connecting step prior to the tower section pre-assembly step. Thus, the platform module or modules are joined to the wall of the segment situated inside the tower once erected, while said segment is still in a horizontal position before carrying out the step of pre-assembly of the sections.

This step of pre-assembly of the sections comprises performing the positioning of the segments adjacently and executing the connections between them, whether temporary or permanent joints, prior to the step of lifting and stacking of the plurality of sections forming the concrete tower.

Thus, the method for assembly of a wind turbine with a concrete tower of the present invention, the step of detaching at least partially from the platform system the segments which form the sections of the concrete tower, allows at least part of platform system platforms to be detached from the segment and transferred and assembled in other wind turbines.

Following the step of detaching at least partially the platform system from the segments which form the sections of the concrete tower, the method comprises a step of disassembly of at least one platform form the platform system. Preferably this step of disassembly of at least one platform from the platform system comprises the disassembly of a plurality of platforms, more preferably of all the platforms except at least the top platform.

This step of disassembly of at least one platform from the platform system is accomplished by firstly disassembling the platform disposed at the lower part of the tower, and then, proceeding upwards disassembling the other platforms.

BRIEF DESCRIPTION OF THE DRAWINGS

FIG. 2 shows a schematic elevation view of the concrete tower of the wind turbine of the present invention wherein the platform system platforms are depicted after the step of lifting and stacking of the plurality of sections forming the concrete tower;

FIG. 3 shows a sectional view AA of FIG. 2.

FIG. 4 shows a detail B of FIG. 2.

PREFERRED EMBODIMENT OF THE INVENTION

Figure 1:
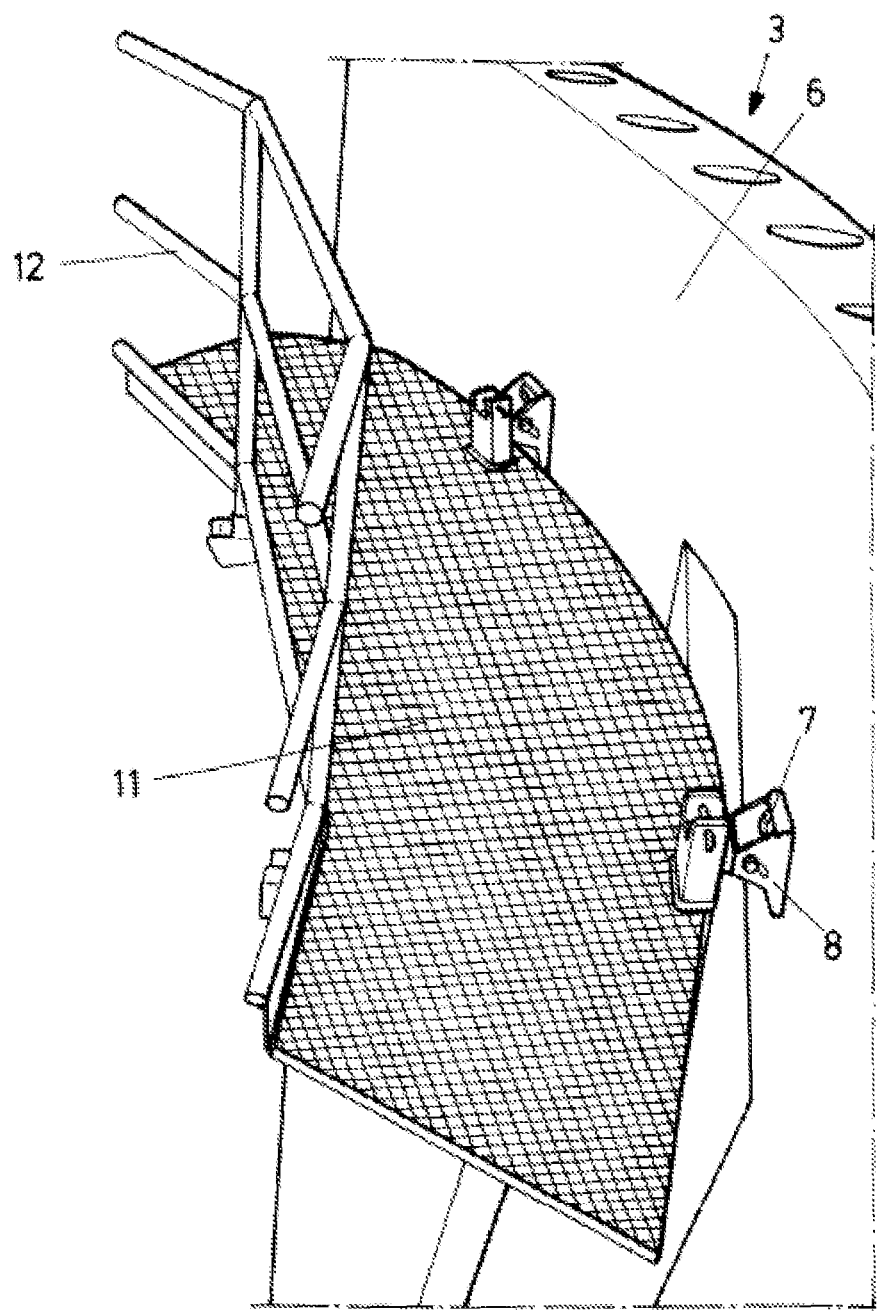
FIG. 1 shows a perspective view of a segment of a section of the concrete tower wherein a platform module of the platform system has been anchored, prior to the step of preassembly of the sections of the concrete tower.
Figure 5:
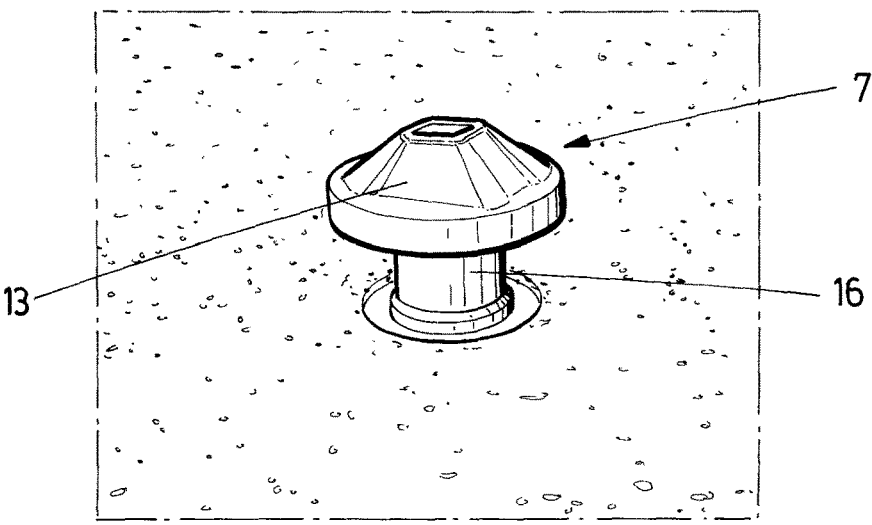
FIG. 5 shows a perspective view of the first anchoring element attached to the wall of the section situated inside the tower once erected.
Figure 6:
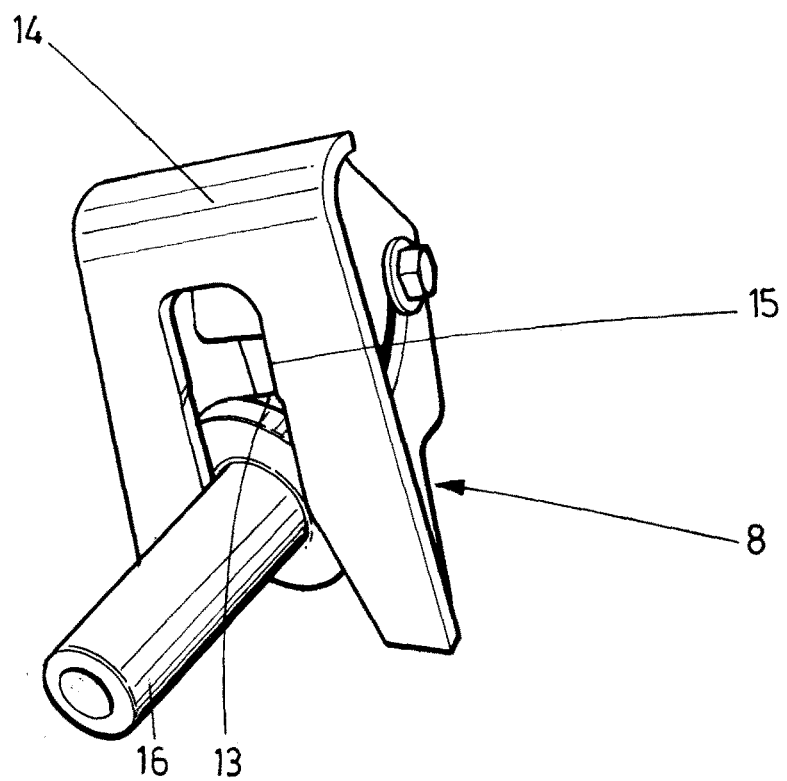
FIG. 6 shows a perspective view of the second anchoring element attached to the platform.

Described below in detail is the wind turbine with a concrete tower of the present invention, wherein the tower (1) comprises a plurality of sections (2) formed by segments (3) and a platform system comprising a plurality of platforms (4) configured for the carrying out of the assembly of said sections (2), the connection between the adjacent sections (2) and to be anchored at least partially in a detachable manner to a wall (6) of the section (2) situated inside the tower once erected or inner wall (6).

The sections (2) of the concrete tower (1) comprise at least one first anchoring element (7) attached to the inner wall (6) of the section (2) where a second anchoring element (8) on the platforms (4) of the platform system is detachably attached.

The wind turbine comprises an elevator (10) arranged inside the tower (1), wherein each of the platforms (4) of the platform system comprises a set of folding modules (9) substantially arranged along the entire inner perimeter of the section (2), except in a section occupied by the elevator (10), wherein each module (9) is detachably attached to a segment (3) of the section (2).

Each module (9) can be coupled to the said segment (3) by two first anchoring elements (7) attached to the inner wall (6) of the segment (3) comprising two second anchoring elements (8).

The folding modules (9) comprise a base (11) and a safety rail (12), wherein the base (11) and safety rail (12) are foldable so that, during assembly, both (11, 12) remain in the folded position so as not to interfere with the assembly work on the segments (3) to form the section (2) of the tower (1).

The safety rail (12) is also adjustable in height, so that during tower section preassembly and stacking manoeuvres, the rails (12) are at a greater height to comply with all safety regulations, while during the lifting and placing of the platform module (9) they are at a lower height to prevent lifting slings from touching the rail (12) and bending it. Once the platform is assembled (4) on the segment (3) and the section (2) has been formed, the rail (12) is lifted to its highest level to comply with the 1100-mm height set by safety regulations.

In a first embodiment, the first anchoring element (7) and the second anchoring element (8) which enable the detachable anchoring of the platform system to the inner wall (6) of the section (2) form a joint with one degree of freedom and the platforms (4) of the platform system comprise at least one support element between said platforms (4) and the wall (6) of the section (2) situated inside the tower (1) once erected.

Preferably, the first anchoring element (7) comprises a rod (16) insertable into the wall (9) of the segment (3) situated inside the tower (1) once erected and a head (13) protruding from said rod, wherein the rod (16) is disposed inside the section (2) once lifted and stacked, while the second anchoring element (8) comprises a pivoting fitting (14) with a longitudinal groove (15) so that the fitting (14) is supportable on the rod (16) of the first anchoring element (7).

The longitudinal groove (15) of the fitting is of greater width than the diameter of the rod (16) of the first anchoring element (7) but narrower than the diameter of the head (13) so the module (9) is anchored to the segment (3). This anchoring system allows an easy disassembly of the platform system once they are no longer needed by simply applying a vertical upward force once removed the safety clamps present in said anchoring system.

Preferably, the modules (9) of each section (2) which are adjacent to the elevator are not detachably anchored to the section (2).

At least one platform (4) is not modular, namely, it is not composed of modules (9) preferably being arranged in the upper section (2) of the concrete tower (1)

The invention also relates to the method for the assembly of a wind turbine with a concrete tower comprising a plurality of sections (2) formed by segments (3) and a platform system comprising a plurality of platforms (4), wherein the platform system is configured to allow access to junction areas between adjacent sections (2), and wherein the method comprises the following steps:

- a step of connecting a platform system comprising a plurality of platforms (4) to a wall (6) of a plurality segments (3) situated inside the tower (1) once erected, wherein the segments (3) form sections (2) of the concrete tower (1);
- a step of pre-assembly of the sections (2) of the concrete tower (1) wherein for each section (2) a plurality of segments (3) are joined together;
- a step of lifting and stacking of the plurality of sections (2) forming the concrete tower (1);
- a step of executing joints between adjacent sections (2), preferably forming coupling joints between sections;
- a step of installation of the nacelle on the concrete tower (1) performed before or after the step of executing the joints between the adjacent sections (2); and
- a step of detaching the platform system, at least partially, from the segments (3) forming the sections (2) of the concrete tower (1).

Preferably, in the step of connecting the platform system, the connection of one platform (4) module (9) per segment (3) is carried out, so that the platform (4) module (9) is attached to the wall (6) of the segment (3) situated inside the tower (1) once erected, while said segment (3) is still in the horizontal position before carrying out the step of pre-assembly of the sections (2).

Following the step of detaching at least partially the platform system from the segments (3) forming the sections (2) of the concrete tower (1), the method comprises a step of disassembly of at least one platform (4) from the platform system, wherein preferably a plurality of platforms (4), more preferably of all platforms (4) are disassembled, except at least the top platform (24).

This step of disassembly of at least one platform (4) of the platform system is accomplished by firstly disassembling the platform (4) arranged in the lower part of the tower, and then, proceeding upwards, disassembling the other platforms (4) except the top platform (24).

The invention claimed is:

1. A wind turbine comprising an erected concrete tower, wherein the concrete tower comprises a plurality of sections formed by segments and a platform system comprising a plurality of platforms, wherein the platform system is configured to allow access to junction areas between adjacent sections of the concrete tower and to be at least partially anchored in a detachable manner to a wall of a section of the concrete tower, the wall being situated inside the concrete tower once erected;

wherein the sections of the concrete tower comprise at least one first anchoring element attached to the wall of the section of the concrete tower situated inside the concrete tower once erected, wherein the platform system is configured to be at least partially anchored in a detachable manner to the at least one first anchoring element attached to the wall of the section of the concrete tower situated inside the concrete tower once erected;

wherein the platforms of the platform system comprise at least one second anchoring element which assists the at least one first anchoring element to achieve the detachable anchoring of the platform system to the wall of the section of the concrete tower situated inside the concrete tower once erected;

wherein the at least one first anchoring element and the at least one second anchoring element which implement the detachable anchoring of the platform system to the wall of the section of the concrete tower situated inside the concrete tower once erected, form a joint with one degree of freedom, wherein the degree of freedom allows the disassembly of the platform system, and the platforms of the platform system comprise at least one support element between the platforms and the wall of the section of the concrete tower situated inside the concrete tower once erected; and wherein the first anchoring element comprises a rod insertable into the wall of the segment situated inside the tower once erected and a head protruding from said rod, wherein the rod is disposed inside the section once lifted and stacked, while the second anchoring element comprises a pivoting fitting comprising a shaft slidable along a slot that allows the folding of the platform with respect to the wall situated inside the tower, and a longitudinal groove so that the pivoting fitting is supportable on the rod of the first anchoring element.

2. The wind turbine of claim 1 wherein the platforms of the platform system comprise a set of modules configured to be taken down through the interior of the concrete tower of the wind turbine and extracted through a door of the concrete tower.

3. The wind turbine of claim 2 wherein the platforms of the platform system comprise at least one module per segment.

4. The wind turbine of claim 3 further comprising an elevator and/or stairs arranged inside the concrete tower and wherein the modules form a continuous platform for each section of the concrete tower except in a space configured for the passage of the elevator and/or stairs.

5. The wind turbine of claim 4 wherein the modules of each section of the concrete tower which are adjacent to the elevator and/or stairs are not detachably anchored to the section of the concrete tower.

6. The wind turbine of claim 2 wherein the modules comprise a base and a safety rail.

7. The wind turbine of claim 6 wherein the base is foldable and the safety rail is adjustable in height.

8. The wind turbine of claim 1 wherein the disassembly of the platform system is carried out applying a vertical upward force in the joint with one degree of freedom which allows the disassembly of the platform system.

9. Method for the assembly of a wind turbine comprising a concrete tower which in turn comprises a plurality of sections formed by segments and a platform system comprising a plurality of platforms, wherein the platform system is configured to allow access to junction areas between adjacent sections of the concrete tower, and wherein the method comprises the following steps:
   a step of connecting the platform system comprising a plurality of platforms to a wall of a plurality of segments, the wall being situated inside the concrete tower once erected, wherein the segments form the sections of the concrete tower;
   a step of pre-assembly of the sections of the concrete tower wherein for each section a plurality of segments are joined together;
   a step of lifting and stacking of the plurality of sections of the concrete tower;
   a step of execution of joints between adjacent sections;
   a step of at least partially detaching the platform system from the segments forming the sections of the concrete tower;
   wherein the step of connecting the platform system comprising a plurality of platforms to a wall of a plurality of segments and the step of at least partially detaching the platform system from the segments forming the sections of the concrete tower are carried out by means of a joint with one degree of freedom, wherein the degree of freedom allows the disassembly of the platform system and wherein the joint with the degree of freedom comprises a rod insertable into the wall of the segment situated inside the tower once erected and a head protruding from said rod, wherein the rod is disposed inside the section once lifted and stacked, a pivoting fitting comprising a shaft slidable along a slot that allows the folding of the platform with respect to the wall situated inside the tower, and a longitudinal groove so that the pivoting fitting is supportable on the rod.

10. The method of claim 9 wherein the step of connecting the platform system comprises connecting at least one platform module per segment prior to the step of pre-assembly of the sections of the concrete tower.

11. The method of claim 9 further comprising a step of disassembly of at least one platform from the platform system after the step of at least partially detaching the platform system from the segments forming the sections of the concrete tower.

12. The method of claim 11 wherein the step of disassembly of at least one platform from the platform system comprises the disassembly of a plurality of the platforms, preferably of all the platforms except at least one top platform.

13. The method of claim 11 wherein the step of disassembly of at least one platform from the platform system is accomplished by firstly disassembling a platform arranged in the lower part of the concrete tower, and secondly, proceeding upwards, disassembling remaining platforms.

14. The method of claim 9 wherein the step of pre-assembly of the sections of the concrete tower comprises carrying out a placement of the segments adjacently and an execution of joints between the segments, the joints between the segments being temporary or permanent, prior to the step of lifting and stacking of the plurality of sections of the concrete tower.

15. The method of claim 10 further comprising a step of disassembly of at least one platform from the platform system after the step of at least partially detaching the platform system from the segments forming the sections of the concrete tower.

16. The method of claim 12 wherein the step of disassembly of at least one platform from the platform system is accomplished by firstly disassembling a platform arranged in the lower part of the concrete tower, and secondly, proceeding upwards, disassembling remaining platforms.

* * * * *